United States Patent [19]

Riedler

[11] 4,250,137
[45] Feb. 10, 1981

[54] PROCESS FOR PREPARING BREAST PADS

[76] Inventor: Walter Riedler, c/o BRB Industries, Inc., 467-11th St., Hoboken, N.J. 07030

[21] Appl. No.: 45,236

[22] Filed: Jun. 4, 1979

[51] Int. Cl.³ .............................................. B29D 27/00
[52] U.S. Cl. ..................................... 264/554; 264/321
[58] Field of Search ................ 264/257, 321, 322, 554

[56] References Cited

U.S. PATENT DOCUMENTS

| | | | |
|---|---|---|---|
| 2,955,971 | 10/1960 | Irwin | 156/79 |
| 3,164,655 | 1/1965 | Howard et al. | 264/321 |
| 3,338,997 | 8/1967 | Tigner | 264/321 X |
| 3,442,741 | 5/1969 | Specht | |
| 3,642,975 | 2/1972 | Duggins et al. | |
| 3,846,526 | 11/1974 | Wade | 264/48 |
| 3,869,337 | 3/1975 | Hoppe et al. | 264/257 X |
| 4,008,029 | 2/1977 | Shokite | 264/322 X |

Primary Examiner—Philip Anderson
Attorney, Agent, or Firm—Gloria K. Koenig

[57] ABSTRACT

Breast pads, cups and fronts for use in brassieres and other garments are molded from a thin, generally planar blank of an open-cell or closed-cell polymeric foam material (e.g. polyurethane). The blank is placed between mold parts and the male mold part then deforms the blank into the configuration of the female mold part while negative pressure is exerted on the female mold part, thereby causing the blank to be seated in the configuration of the female mold part. The male mold part is then withdrawn, negative pressure is discontinued and the male mold is again placed in contact with the blank and heat and positive pressure are simultaneously applied to the mold parts to cause compression of the cells of the blank and to thereby cause the cells to become permanently reformed into their compressed positions.

7 Claims, 5 Drawing Figures

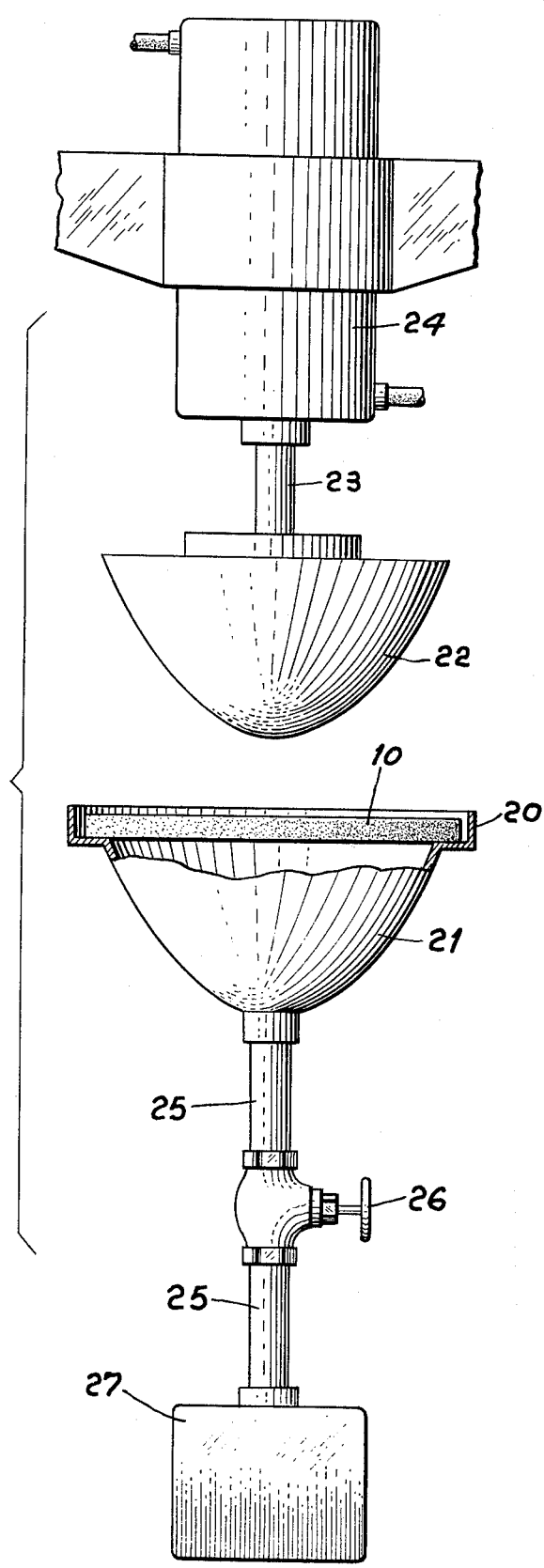
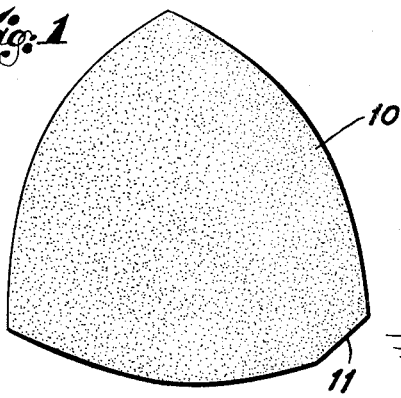
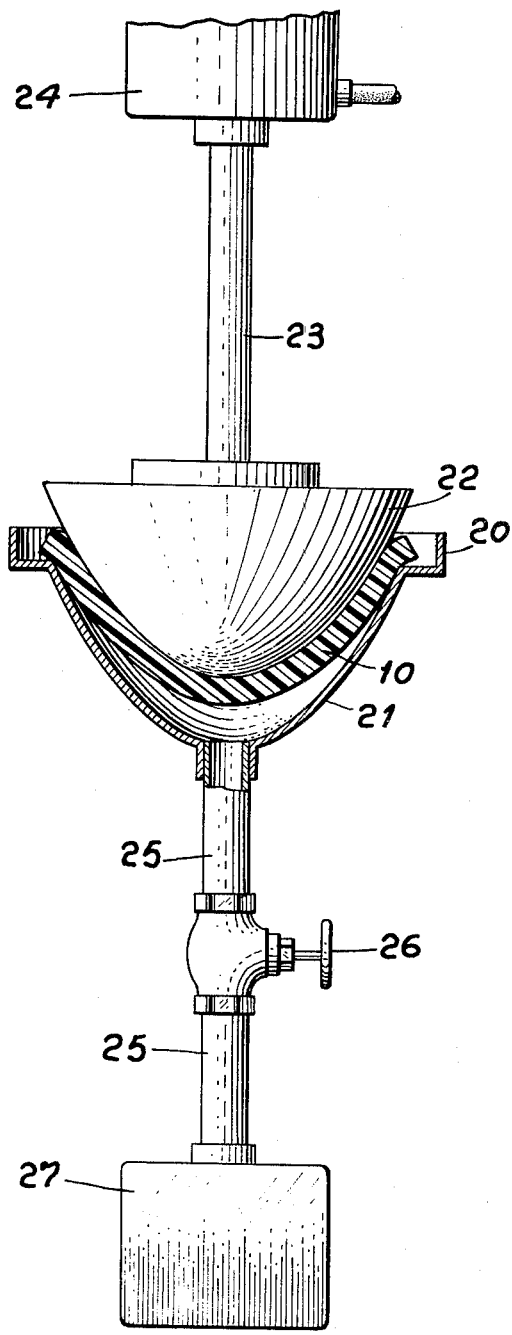

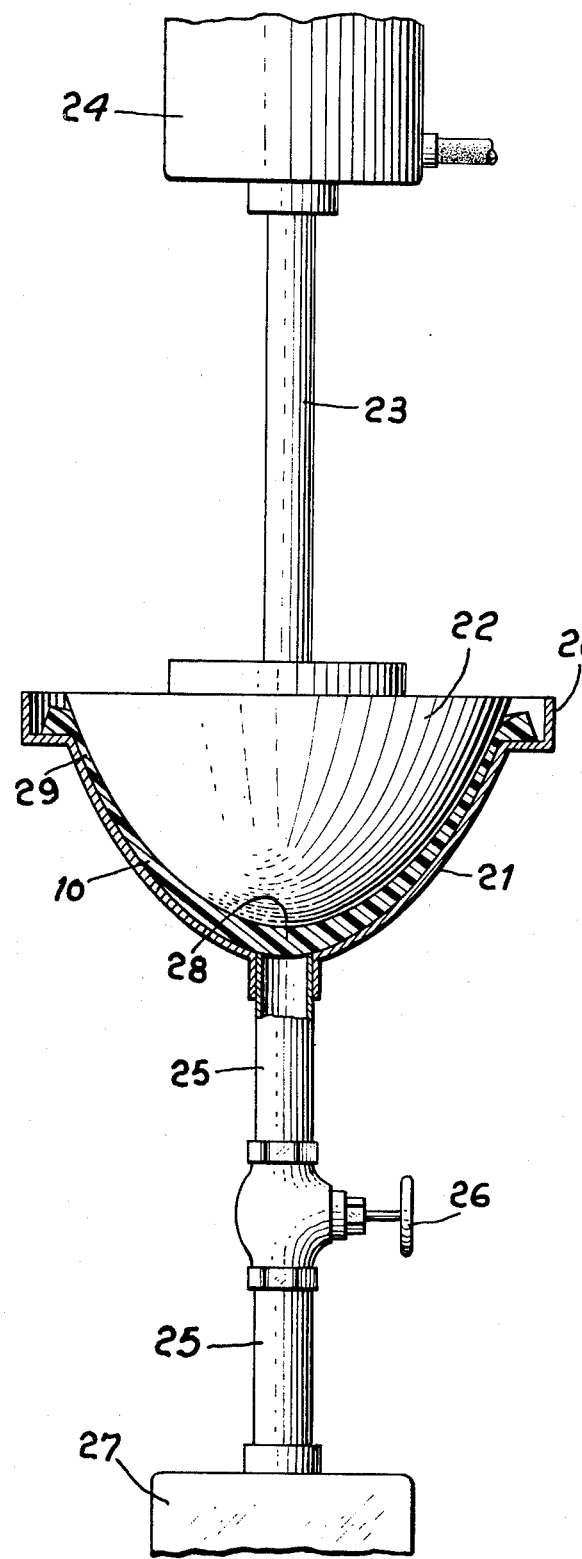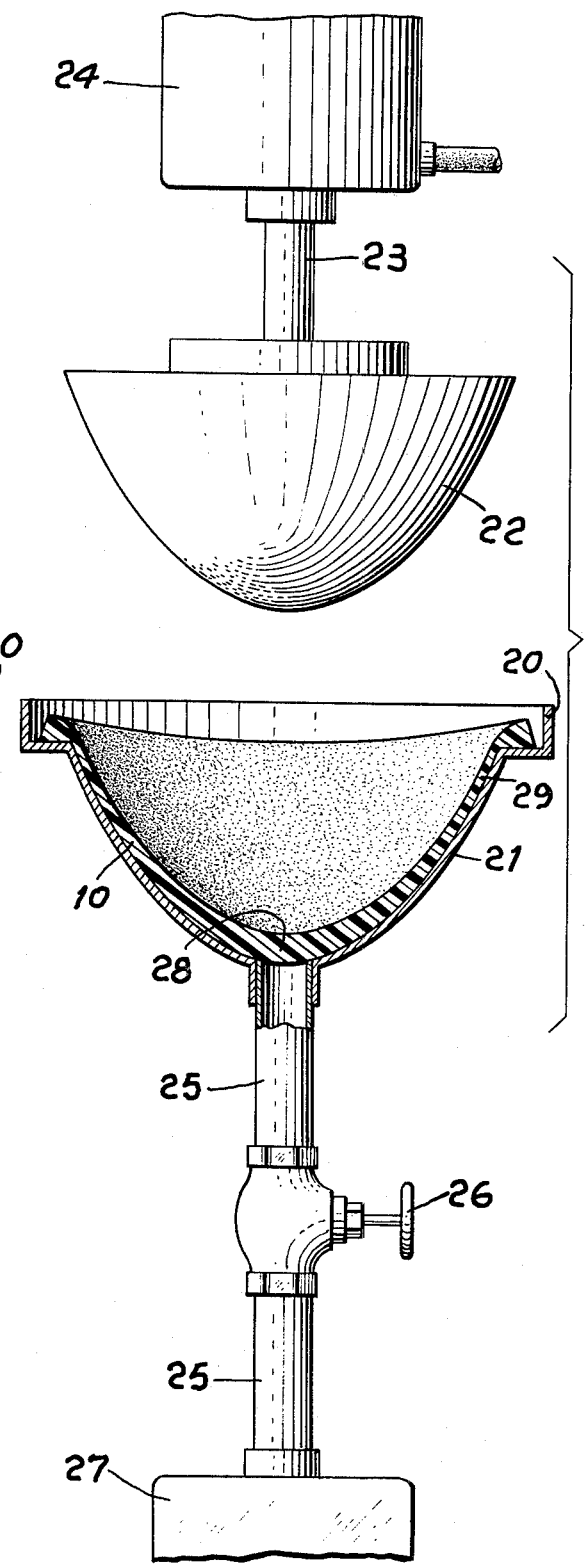

PROCESS FOR PREPARING BREAST PADS

BACKGROUND OF THE INVENTION

1. Field of the Invention

This invention relates to a method of preparing breast pads, cups, fronts and the like for use in brassieres and other garments.

It is a primary requisite of breast pads, cups, fronts and the like (hereinafter generically referred to as "breast pads") that they possess and be capable of retaining a smooth, evenly-tapering outline which will confer on the finished brassiere a natural appearance. Further, in addition to the obvious requirements that the breast pads must confer upon the brassiere the necessary support for the female breasts and make the breasts appear larger, the pads, when incorporated into the brassiere, must stand up well under wear, be substantially resilient so as to adapt themselves to the various positions and motions of the wearer, returning always to their original shapes and their shapes and resiliency should not be affected by laundering of the brassiere. Further, the breast pads, when incorporated into the brassiere, should be comfortable; in particular, it has been found to be desirable to provide breast pads which are relatively soft at their centers or nipple areas, but are correspondingly firmer at their sides so as to prevent the pad from collapsing and to give a natural feel to the wearer. Finally, the breast pads should be easy and economical to manufacture; in particular, the method for preparing the breast pads should permit rapid manufacture of the pads with a minimal "scrap" loss of the stock material from which the pads are to be formed.

2. Description of the Prior Art

Methods for molding breast pads from foam materials such as polyurethanes are known in the prior art, as is evidenced by U.S. Pat. No. 3,164,655, issued Jan. 5, 1965 to Jack E. Howard et al. However, this invention differs in several respects from the Howard et al patent and more importantly results in a more rapid, economical process and more comfortable breast pads.

In the Howard patent, a block of the foam material must first be cut so as to provide a thin, hollow blank having a generally conical configuration corresponding to that of the ultimately desired shape of the breast pad. This cutting operation requires expensive, complex equipment, is time-consuming, and is uneconomical, since a substantial amount of "scrap" foam material is left over. In contradistinction thereto, the instant invention starts with a thin (e.g. about ½ inch in thickness) generally planar (i.e. "flat") material which can be quickly cut from conventionally-sized foam slabs into blanks of any desired shape depending on the cutting die. Up to 20 blanks of ½ inch material can be cut at one stroke in a few seconds using relatively inexpensive, die cutting equipment. Likewise, approximately 40 blanks of ¼ inch material can be cut using similar die cutting equipment. The Howard method, on the other hand, requires one blank to be sliced at a time, which is much slower and more costly. Further, the starting shape of the Howard blank necessarily requires that the block from which the blank is cut be of cured polyurethane foam material, whereas in the instant invention, either cured or uncured material may be utilized as the stock material.

Howard requires a molding operation of approximately 120 psi pressure, heat of approximately 320° F. and a molding time of approximately two minutes and forty seconds. In the instant invention, it is possible to employ a molding cycle involving only about 60 psi pressure, a heat of approximately 400° F. (which may be varied depending on the temperature of the surroundings and the thickness of the material) and a molding time of only 10 to 40 seconds depending on the type of material, i.e., a molding time of only one-fourth of that of Howard. Further, the instant invention makes use of vacuum to insure that the blank is deformed into and fully seated within the female mold part before molding pressures and temperatures are applied, whereas Howard depends on a molding pressure of double that required in the instant invention. Excessive molding pressures are undesirable in that they may lead to numerous "rejects."

SUMMARY OF THE INVENTION

The present invention relates to a rapid, economical method for preparing breast pads having the requisites recited in the "Field of Invention." The breast pads are molded for a thin, generally planar (i.e. "flat") blank of a suitable open-cell or closed-cell polymeric foam material such as polyurethanes, polyesters, Kodel fiber, etc. The blank is placed on a guide-frame between mold parts of the male mold part then deforms the blank into the configuration of the female mold part while negative pressure is exerted on the female mold. The cell structure of the porous blank is thereby partially sealed by the heat and pressure applied causing the blank to be seated in the configuration of the female mold. The male mold is then withdrawn and negative pressure is continued forcing the blanks to move deeper into the cavity of the female mold. The male mold is again placed in contact with the blank and heat and positive pressure are simultaneously applied to the mold parts to cause compression of the cells of the blank and to thereby cause the cells to become permanently reformed into their compressed positions. When the male mold is lifted, negative pressure is restarted to hold the breast pad in the female mold, to prevent the breast pad from being thrown on to the floor at the final separation of the molds. After placing the blank on the guide, the entire cycle is mechanically automated.

Because the instant invention preferably utilizes male mold parts which do not have the exact configurations as the corresponding female mold parts, it is possible to provide a breast pad whose center or nipple area is somewhat softer than its sides. As a preferable embodiment of the present invention the o.d. at the base, and degree of taper, of the male mold part will differ from the i.d. at the base, and the degree of taper of the corresponding female mold part such that during the molding cycle of the process, the center of the male mold part is not in face-to-face contact with the center of the female mold part. In a typical case, as for molding a "B" cup, the circumference of the male mold part at its base is 16¼ inches and such part has an altitude of 2¼ inches, while the circumference of the corresponding female part is 17 inches and such part has an altitude of 2¾ inches.

As an additional preferable embodiment, it has been found desirable to apply vacuum to the female mold part after completion of the molding cycle; this embodiment insures that the the molded breast pad will not adhere to the male mold part when the part is withdrawn from the female mold part. If the molded breast pad adheres to the male mold part, it may fall to the floor and become soiled.

The objects and advantages of the present invention and its benefits and features will be more apparent by the ensuing description taken in conjunction with the accompanying drawing in which, wheresoever possible, like characters of reference designate corresponding material and parts throughout the several views thereof.

BRIEF DESCRIPTION OF THE DRAWINGS

FIG. 1 is a top view of a flat blank which has been cut from a block of suitable polymeric foam material;

FIG. 2 is a sectional view of a mold in open position;

FIG. 3 is a sectional view of a mold with the male mold thrust partly into the cavity of the female mold with the blank thereinbetween partly deformed into the cavity of the female mold;

FIG. 4 is an enlarged sectional view of a mold during the molding cycle;

FIG. 5 is an enlarged sectional view of a mold at the completion of the molding cycle with the male mold in open position and the finished, i.e. the molded, blank lying within the cavity of the female mold.

DESCRIPTION OF THE PREFERRED EMBODIMENTS

Blank 10 is a generally flat piece which has been cut from a slab of suitable polymeric foam material (e.g. typically ½ inch thick). Blank 10 is shown in FIG. 1 as "shield"-like in shape to minimize excess wastage; however, any shape may be employed so long as the dimensions of the blank in all directions are slightly greater than those of the desired molded breast pad. Blank 10 preferably has a corner cut off resulting in a straight edge area 11 which serves as a guide for insertion into a corresponding straight-edge area in guide-frame 20 shown in FIG. 2. Providing straight-edge area 11 is especially useful when it is desired to simultaneously mold pairs of breast pads. Typically, breast pads are molded as right- and left-pairs, i.e. 2, 4, 6, 8 or more breast pads may be simultaneously molded by the process of this invention; however, for ease in understanding this invention, reference will be made to the molding of a single breast pad, it being understood that the description which follows is not to be interpreted as a limitation as to the number of breast pads which may be simultaneously molded.

As shown in FIG. 2, blank 10 is placed in a guide-frame 20 which is affixed to the top of the cavity of female mold part 21. Female mold part 21 is open to communication with vacuum line 25 which in turn communicates, through valve 26, with vacuum system 27. Vacuum system 27 may be any type of a pump or other means which has the capacity to exert a vacuum of 6-14 inches of mercury, preferably at least 10 inches of mercury in simultaneous communication with 2, 4, 6, 8, etc. female mold parts. Also shown in FIG. 2 is male mold part 22 which is mounted within the molding equipment for sliding-downwardly movement upon the downward movement of the piston 23 of a hydraulic unit 24. Both female mold part 21 and male mold part 22 are equipped with heating means such as electrical heating rods, resistance wires, etc. which are not shown in the drawings. For the purposes of this invention, it is desirable that mold parts 21 and 22 be continuously heated throughout all stages of the molding process; heating means having the capacity to heat the mold parts 21 and 22 to temperatures of 350°-450° F. will be sufficient, depending upon the material used.

As a preferable embodiment, mold parts 21 and 22 are not exact mates; by having parts 21 and 22 differ slightly (e.g. ¼-¾ inch, preferably ½ inch) in dimensions, it is possible to provide a finished, molded breast pad with a soft center. As is readily apparent in FIG. 4, during the molding cycle of this process, the center 28 of the breast pad will be slightly thicker as a result of the slight dissimilarity in dimensions of mold parts 21 and 22. The following table indicates the typical dimensions of the female and male mold parts 21 and 22:

|  | Female Mold 21 | Male Mold 22 |
| --- | --- | --- |
| | Cup Size "A" | |
| Circumference | 17 in. | 16 ½ in. |
| Altitude | 2 ¾ in. | 2 ¼ in. |
| | Cup Size "B" | |
| Circumference | 17 ½ in. | 17 in. |
| Altitude | 3 in. | 2 ½ in. |
| | Cup Size "C" | |
| Circumference | 18 in. | 17 ½ in. |
| Altitude | 3 ¼ in. | 2 ¾ in. |

Referring now to FIG. 3, after blank 10 has been placed in guide-frame 20, male mold part 22 is lowered by means of piston 23 and partially deforms blank 10 into the cavity of female mold part 21. As piston 23 is lowered, valve 26 is opened providing open communication between female mold part 21 and vacuum system 27 through line 25; vacuum system 27 typically exerts about 10 inches of mercury vacuum on female mold part 21, thereby causing blank 10 to become well seated within the cavity of female mold part 21. Male mold part 22 is then withdrawn while vacuum is still being exerted on female mold part 21. Approximately 3 seconds are required for this step prior to the initiation of the molding cycle. Thereafter the male mold part 22 is fully urged, via piston 23 into female mold part 21 in preparation for the molding cycle of this invention.

FIG. 4 illustrates the molding cycle of this invention. Male mold part 22 is fully urged via piston 23 into female mold part 21 and vacuum valve 26 is closed, thereby cutting off communication between the female mold part 21 and the vacuum system 27. Sufficient pressure is applied by means of hydraulic unit 24 such that during the molding cycle (which lasts for 30-60 seconds, preferably about 40 seconds depending on the thickness of blank 10 and the molding temperature), a pressure of 50-80 p.s.i., preferably 60 p.s.i. is applied concurrent with a molding temperature of 360°-420° F., preferably 400° F., depending on the material used. Typically, for a ½ inch thick blank 10 to be molded in a "B" cup-size, the molding cycle will be about 40 seconds, the molding pressure will be about 60 p.s.i, and the molding temperature will be about 400° F. The temperature may be varied depending on the desired molding cycle time, thickness of blank 10 and the ambient temperature of the surrounding environment. During the molding cycle, the cells of blank 10 will be compressed by the pressure and the blank 10 will be deformed into the configuration of female mold part 21; the heat and pressure applied during the molding cycle will cause the cells of blank 10 to become permanently reformed into their compressed positions. It should be understood that sources of pressure other than hydraulic and heating sources other than electrical may be used during the molding cycle.

As is apparent from FIG. 4, the center 28 of blank 10 is thicker than the sides 29. While heat and pressure are required to shape the breast cup, and the blank 10 fills the space between the molds, the mold parts 21 and 22 do not compress the material at the center 28 of the blank as much as along the sides. This is readily accomplished by insuring that the mold parts 21 and 22 are slightly dissimilar in dimensions as mentioned above. Thus the sides of the cup are relatively more rigid than the relatively soft center 28, providing support for the female breast cup after the finished molded breast pads have been incorporated into a brassiere.

Referring now to FIG. 5, after the molding cycle has been completed, male mold part 22 is withdrawn upward from female mold part 21, with concurrent opening of vacuum valve 26, thereby permitting part 21 to again be in open communication with vacuum system 27 which typically exerts a vacuum of 10 inches of mercury, as mentioned above, thereby assuring that the finished molded blank 10 will remain in part 21 rather than stick to male mold part 22 and fall to the ground and become soiled as part 22 is upwardly withdrawn. Once the male mold is opened, within 3 seconds, the vacuum shuts off to end the cycle.

The molded breast pads 10 are then removed from the female mold parts 21 and are incorporated into brassieres by conventional methods. When sewing the pads into the brassieres, the ridges formed at the edges of the pads from the mold parts 21 and 22 as sewing/cutting guides for inclusion into brassieres.

I claim:

1. A process for forming a unitary, seamless breast pad from an open-cell or closed-cell polymeric foam material comprising the steps of:
   (a) providing a thin, generally planar blank of said material, placing said blank between the parts of a two-part mold comprising a male mold part, and a female mold part in communication with a vacuum system capable of exerting a negative pressure on said female mold part, said mold parts being capable of engaging the inside and outside surfaces of said blank and defining between them the cross-sectional configuration of the pad being formed;
   (b) heating said mold parts to a temperature within the range of 350° and 450° F.;
   (c) causing the male mold part to contact the outside surface of the blank so as to deform the blank at least partially into the configuration of the female mold part, and concurrently exerting a negative pressure on said female mold part by means of said vacuum system so as to cause said blank to be seated within said female mold part;
   (d) disengaging the male mold part from contact with the outside surface while continuing negative pressure to be exerted on said female mold part; and
   (e) causing said male mold part to again contact the outside surface of the blank while discontinuing the exertion of negative pressure on said female mold part, and applying a positive pressure to said mold parts to compress the cells of said blank and deform said blank into said configuration and applying heat to said mold parts simultaneously with said pressure, said heat being applied to the inside and outside surfaces of said blank, said heat penetrating substantially completely through the cells of said blank to cause said cells to become permanently reformed into their compressed positions.

2. The process of claim 1 in which the breast pad is removed from said mold parts by disengaging contact of the male mold part with the outside surface of the pad, simultaneously exerting a negative pressure on the female mold part to insure that the pad will remain within the female mold part after such disengagement of contact, and thereafter extracting said pad from the female mold part.

3. The process of claim 1 in which the blank has a thickness of approximately ½ inch, and steps (c) and (d) are carried out over a period of time totalling approximately 3 seconds.

4. The process of claim 1 in which the negative pressure is approximately 10 inches of mercury.

5. The process of claim 1 in which the positive pressure applied to said mold parts is approximately 60 pounds per square inch of mold area and the heat applied to said mold parts is approximately 400° F., such heat and pressure being applied simultaneously for approximately forty seconds.

6. The process of claim 1 in which the vacuum system is in simultaneous communication with four female mold parts and four breast pads are simultaneously molded.

7. The process of claim 1 in which the configuration of the female mold part differs slightly from the configuration of the male mold part.

* * * * *